United States Patent
Hamada et al.

(10) Patent No.: US 6,487,193 B1
(45) Date of Patent: Nov. 26, 2002

(54) PATH SEARCHED DEVICE AND CDMA RECEIVER WITH THE SAME

(75) Inventors: Hajime Hamada, Kawasaki (JP); Yasuyuki Oishi, Kawasaki (JP); Kazuo Nagatani, Kawasaki (JP); Michiharu Nakamura, Kawasaki (JP); Koji Matsuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/378,265

(22) Filed: Aug. 20, 1999

(30) Foreign Application Priority Data

Sep. 4, 1998 (JP) .......................................... 10-251032

(51) Int. Cl.[7] .............................................. H04B 7/216
(52) U.S. Cl. ...................... 370/342; 370/335; 370/350; 375/145; 375/355
(58) Field of Search ............................... 370/335, 342, 370/350; 375/145, 355

(56) References Cited

U.S. PATENT DOCUMENTS

| | | | | |
|---|---|---|---|---|
| 5,881,058 A | * | 3/1999 | Chen .......................... | 370/335 |
| 5,949,812 A | * | 9/1999 | Turney et al. ............... | 375/200 |
| 6,064,690 A | * | 5/2000 | Zhou et al. .................. | 375/207 |
| 6,144,649 A | * | 11/2000 | Storm et al. ................. | 370/335 |
| 6,226,315 B1 | * | 5/2001 | Sriram et al. ................ | 375/140 |

* cited by examiner

*Primary Examiner*—Edward F. Urban
*Assistant Examiner*—Temica M. Davis
(74) *Attorney, Agent, or Firm*—Katten, Muchin, Zavis Rosenman (57) ABSTRACT

The present invention is directed to a path searching device and a CDMA receiver employing the same, having a reduced circuit scale and operating to carry out a smaller number of operations. For a direct spreading CDMA communication system, a CDMA receiver includes a reception demodulator including an antenna, a high-frequency amplifier a band-pass filter, demodulators, etc. The CDMA receiver also has despreading units, a determination unit, and a path search device. The path search device has a sampling unit for sampling an input signal by low-speed oversampling based on an integer multiple of a chip rate and by high-speed oversampling that is faster than the low-speed oversampling, a first circuit for finding a correlative value between a spreading code and a signal provided by the low-speed oversampling and finding timing corresponding to a maximum correlative value. A second circuit for finding despreading timing according to correlative values between a signal provided by the high-speed oversampling and a spreading code corresponding to the timing provided by the first circuit.

20 Claims, 6 Drawing Sheets

PATH SEARCHED DEVICE AND CDMA RECEIVER WITH THE SAME

BACKGROUND OF THE INVENTION

The present invention relates to a path searching device for a direct sequence CDMA (Code Division Multiple Access) communication system and to a CDMA receiver employing the path searching device.

A CDMA receiver for the direct sequence CDMA communication system includes a path searching device (or a path searcher) for finding despread timing. Although the path searching device can be a sliding correlator, it is usually a matched filter. However, it would be desirable to reduce the circuit scale of these devices.

Figure 5:
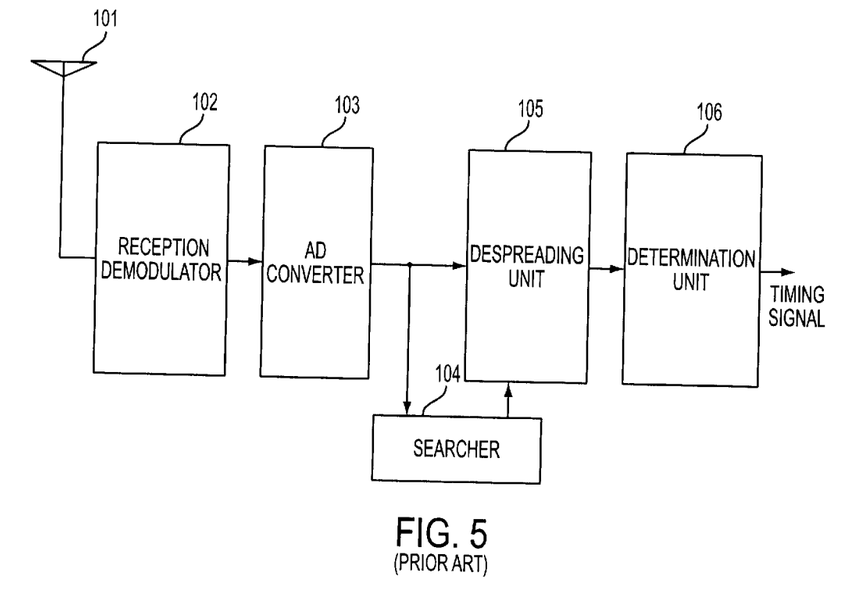
FIG. 5 is a block diagram showing a CDMA receiver.

FIG. 5 shows a CDMA receiver. Reference numeral 101 designates an antenna, 102 a reception demodulator, 103 an AD converter, 104 a searcher (a path search device), 105 a despreading unit, and 106 a determination unit. Although the searcher 104 may be a matched filter or a sliding correlator, it is usually a matched filter. The despreading unit 105 has a code generator for despreading.

The antenna 101 is either installed in a base station or a mobile station of a direct sequence CDMA communication system. The antenna 101 receives a spread and modulated signal. The reception demodulator 102 demodulates the signal, the AD converter 103 converts the signal into a digital signal, the despreading unit 105 despreads the digital signal, and the determination unit 106 reproduces a received bit string. In order to synchronously generate spreading codes for a despreading operation carried out by the despreading unit 105, the searcher 104 provides a timing signal.

Figure 6:
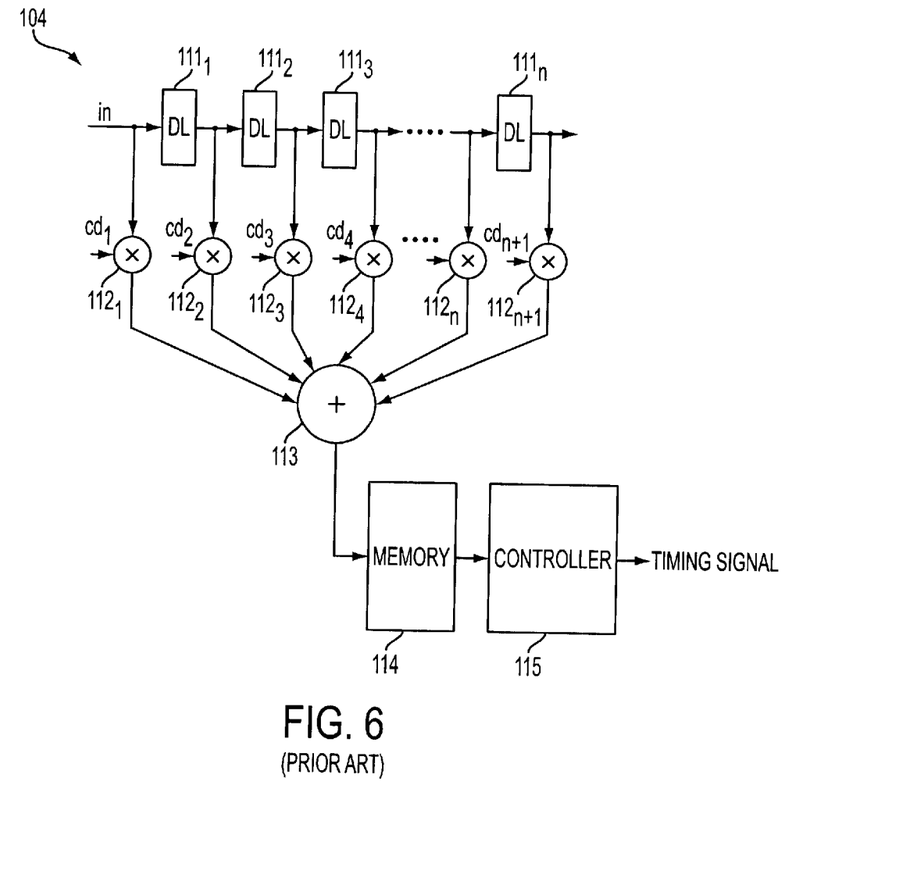
FIG. 6 is a block diagram showing a prior art searcher.

FIG. 6 shows a prior art searcher. Numerals $111_1$–$111_n$ designate delay elements (DLs) that form a shift register, $112_1$–$112_{n+1}$ multipliers, 113 an adder, 114 a memory, and 115 a controller. The delay elements $111_1$–$111_n$ serve as a shift register, while the multipliers $112_1$–$112_{n+1}$, and adder 113 constitute a matched filter.

If the AD converter 103 of FIG. 5 carries out a sampling operation according to a particular chip rate, the delay elements $111_1$–$111_n$ of FIG. 6 serves as a shift register that provides a time delay based on the chip rate. In order to carry out oversampling that is several times faster than the chip rate, the delay elements provide a time delay corresponding to an oversampling interval. In this case, the number of the delay elements must comply with a multiple related to the oversampling.

The shift register made of the delay elements $111_1$–$111_n$ receives an input signal "in" which is a digital signal sampled and converted by the AD converter 103. Output signals from the taps of the delay elements are multiplied in the multipliers $112_1$–$112_{n+1}$ by spreading codes $cd_1$–$cd_{n+1}$ provided by a code generator (not shown). Further, output signals from the multipliers are then combined in the adder 113.

An output signal from the adder 113 represents correlation values between spreading codes of the spread and modulated signal, and spreading codes for despreading. An average of the correlation values from the adder 113 is obtained with the use of the memory 114, and according to the average, the controller 115 provides a timing signal to the despreading unit 105. According to the timing signal, the despreading unit 105 controls the timing of the code generator (not shown) for generating spreading codes.

The shift register that forms the matched filter of the searcher 104 for a CDMA receiver must have a number of stages that is sufficient to cover the length of spreading codes. In order to enable oversampling, the shift register must have taps whose number corresponds to an oversampling multiple. In particular, the number of stages of the shift register must be equal to the product of the length of spreading codes and the oversampling multiple. This raises a problem since circuit scale of the matched filter is greatly increased.

SUMMARY OF THE INVENTION

An object of the present invention is to provide a path searching device that has a reduced circuit scale.

Another object of the present invention is to provide a path searching device that operates to execute a reduced number of processes.

Figure 1:
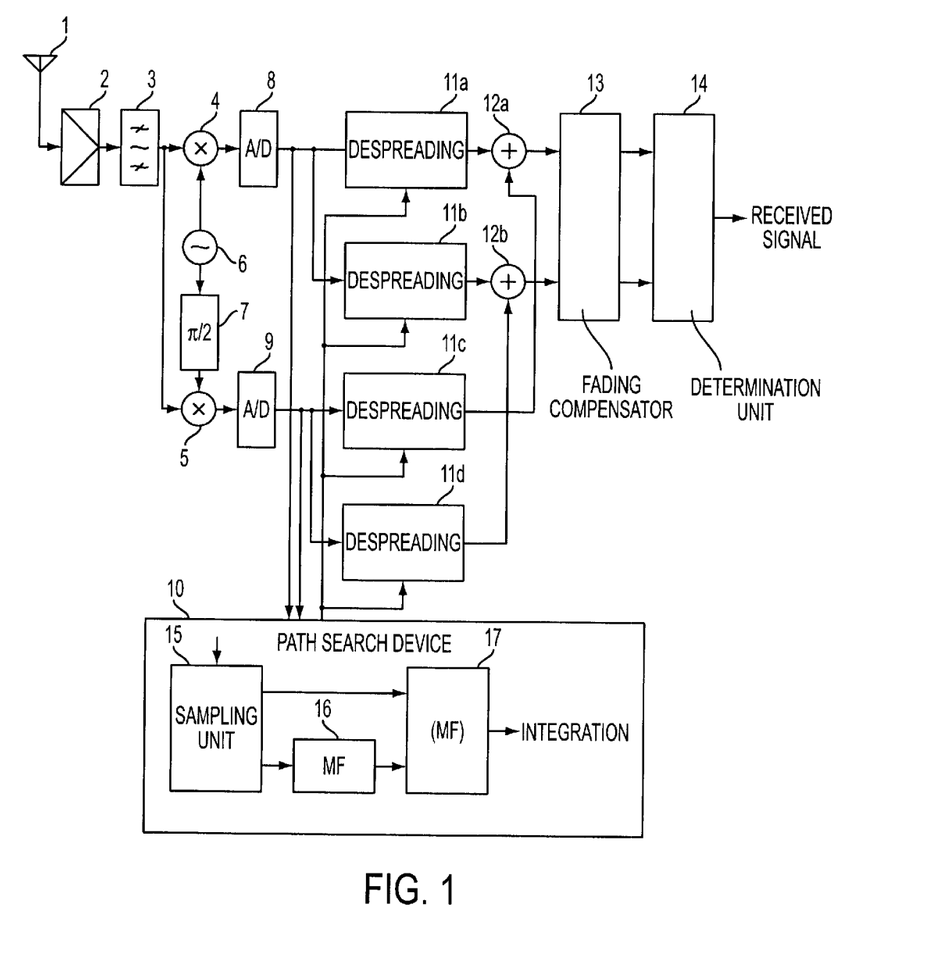
FIG. 1 is a block diagram showing CDMA receiver according to the present invention.

These and other objects are met by a path searching device according to the present invention that determines despreading timing in a direct sequence CDMA communication system. FIG. 1 shows the searching device which includes a sampling unit that samples an input signal by low-speed oversampling based on an integer multiple of a chip rate and by high-speed oversampling that is faster than the low-speed oversampling. A first circuit of a matched filter structure is included that finds a correlation value between a spreading code and a signal provided by the low-speed oversampling. Further, the first circuit finds timing corresponding to a maximum correlation value. A second circuit 17 is also included that finds despreading timing according to correlation values between a signal provided by the high-speed oversampling and spreading codes generated according to the timing provided by the first circuit.

The second circuit of the path search device receives a spreading code generated according to the timing provided by the first circuit. The second circuit also shifts the phase of the spreading code by an interval of the high-speed oversampling and, finds a correlative value between the spreading code and a signal provided by the high-speed oversampling. Further, the second circuit integrates such correlation values and finds a despreading timing according to a phase that provides a maximum integrated value.

The second circuit of the path search device consists of a delay element for receiving a spreading code generated according to the timing provided by the first circuit and shifting the phase of the spreading code by an interval of the high-speed oversampling. A multiplier is also included that finds a correlation value between the spreading code passed through the delay element and a signal provided by the high-speed oversampling. An adder and a delay element that integrates an output signal of the multiplier, and a timing signal output unit that finds despread timing according to a maximum value found in the integrated output signal.

The second circuit of the path search device according to the present invention may also consist of a matched filter that receives approximately one chip length of a signal provided by the high-speed oversampling and finds a correlative value accordingly.

The path search device according to the present invention may also consist of a matched filter serving as the first and second circuits. A switch is also included that switches a signal provided by the high-speed oversampling and a signal provided by the low-speed oversampling from one to another in time division so that the signals are supplied to the matched filter in time division. An arrangement is further providing despreading timing when the high-speed oversampling provides a signal.

The present invention also consists of a CDMA receiver having a reception demodulator, an AD converter, a despreading unit, a determination unit, and a path search device. The path searching device can consist of a sampling unit for sampling an input signal by low-speed oversampling based on an integer multiple of a chip rate and by high-speed oversampling that is faster than the low-speed oversampling. A first circuit of a matched filter structure for finding a correlative value between a spreading code and a signal provided by the low-speed oversampling, further, finding timing corresponding to a maximum correlative value. A second circuit is also included for finding despreading timing according to correlative values between a signal provided by the high-speed oversampling and spreading codes generated according to the timing provided by the first circuit.

DETAILED DESCRIPTION

FIG. 1 shows a CDMA receiver including a path search device according to the present invention. Reference numeral 1 designates an antenna, 2 a high-frequency amplifier, 3 a band-pass filter, 4 and 5 demodulators, 6 a local oscillator, 7 a phase shifter, 8, 9 AD converters (A/Ds), 10 a path searching device, 11a–11d despreading units, 12a, 12b adders, 13 a fading compensator, 14 a determination unit, 15 a sampling unit (SMP), 16 a first circuit of a matched filter (MF) structure to receive a signal provided by low-speed oversampling, and 17 a second circuit such as an integrator circuit or a matched filter to receive a signal provided by high-speed oversampling.

The sampling unit 15 in the path search device 10 is an AD converter for achieving the high-speed oversampling and low-speed oversampling. Although the sampling unit 15 may be realized by the AD converters 8, 9, it is discrete for the sake of this explanation.

The antenna 1 receives a CDMA signal modulated based on OPSK, the high-frequency amplifier 2 amplifies the signal, and the band-pass filter 3 removes unnecessary bands from the signal. The demodulator 4 demodulates the signal according to a locally oscillated signal from the local oscillator 6 into a base-band signal. The demodulator 5 demodulates the signal according to a signal that has been locally oscillated and phase-shifted by $\pi/2$ in the phase shifter 7, into a base-band signal.

The AD converters 8, 9 convert the base-band signals into digital signals, which are supplied to the despreading units 11a–11d. The despreading units 11a–11d each include a code generator for generating spreading codes according to a timing signal provided by the path search device 10. The despreading codes are used to despread the received signal. The adders 12a–12b combine the despread signals and the fading compensator 13 compensates fading fluctuation for the combined signals. The determination unit 14 processes the compensated signals.

The path searching device 10 includes a sampling unit 15 that samples a received demodulated signal by high-speed oversampling and low-speed sampling. The oversampling is for example, eight times faster than a chip rate. The low-speed oversampling, for example, is four or two times faster than the chip rate. A signal provided by the high-speed oversampling is supplied to a second circuit 17, and a signal provided by the low-speed oversampling is supplied to a first circuit 16. The low-speed-oversampled signal may be obtained by thinning or downsampling a signal provided by the high-speed oversampling.

The first circuit 16 includes a matched filter to provide a maximum correlation value for a signal provided by the low-speed oversampling and according to the maximum correlation value produces the despreading timing. The second circuit 17 may be an integrator circuit or a matched filter. According to spreading codes generated according to the coarse despread timing provided by the first circuit 16, the second circuit 17 provides despread timing having an accuracy dependent on the high-speed oversampling.

Since the first circuit 16 is a matched filter for handling signals provided by the low-speed sampling, the circuit scale and the number of operations thereof are smaller than those of a matched filter that handles signals provided by high-speed sampling. Since the second circuit 17 finds correct despreading timing within a range of one or several chips around the coarse despreading timing, the circuit scale and the number of operations thereof are small.

Figure 2:
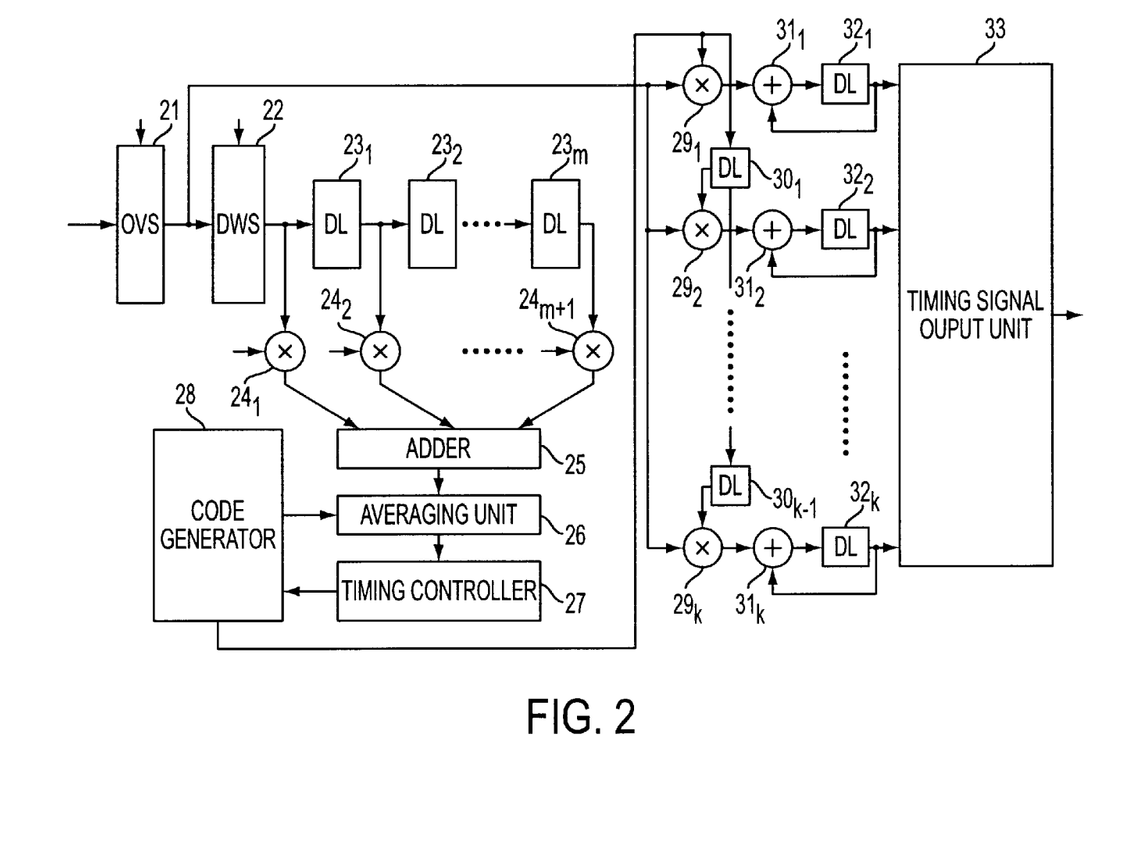
FIG. 2 is a block diagram showing a first embodiment of the path searching device according to the present invention.

FIG. 2 shows a first embodiment of the path search device according to the present invention. Reference numeral 21 designates an oversampling unit (OVS), 22 a downsampling unit (DWS), $23_1$–$23_m$ delay elements (DLs) having a delay time based on a downsampling interval and forming a shift register, $24_1$–$24_{m+1}$ multipliers, 25 an adder, 26 an averaging unit, 27 a timing controller, 28 a code generator, $29_1$–$29_k$ multipliers $30_1$–$30_{k-1}$ delay elements (DLs) having a delay time based on an oversampling interval, $31_1$–$31_k$ adders, $32_1$–$32_k$ delay elements (DLs) having a delay time based on the oversampling interval, and 33 a timing signal output unit.

The delay elements $23_1$–$23_m$, multipliers $24_1$–$24_{m+1}$, adder 25, averaging unit 26, and timing controller 27 correspond to the matched filter structure of the first circuit 16 of FIG. 1. The multipliers $29_1$–$29_k$, delay elements $30_1$–$30_{k-1}$, and delay elements $32_1$–$32_k$ correspond to the integrator structure of the second circuit 17 of FIG. 1.

The code generator 28 generates spreading codes of a predetermined length in parallel and provides them in series (time series). The code generator 28 may have a basic structure for generating parallel spreading codes as well as series spreading codes. Alternatively, it may have discrete structures for parallel and series spreading codes. In any case, series spreading codes are generated according to timing provided by the timing controller 27 of the first circuit.

The multipliers $24_1$–$24_{m+1}$ receive signals downsampled by the downsampling unit 22 and delayed by the delay elements $23_1$–$23_m$ as well as spreading codes, at path search timings such as the start of a slot, to multiply these signals. Series spreading codes from the code generator 28 are supplied directly to the first multiplier $29_1$. Further, series spreading codes from the code generator 28 are also supplied through the delay elements $30_1$–$30_{k-1}$ to the multipliers $29_1$–$29_k$. As a result, the multipliers $29_1$–$29_k$ receive in time series, spreading codes having a phase difference equal to a high-speed oversampling interval. Spreading codes to be applied to the multipliers $24_1$–$24_{m+1}$ may be generated by the code generator 28.

An output signal of the high-speed oversampling of the oversampling unit 21 is supplied to the multipliers $29_2$–$29_k$ of the second circuit. An output signal of the low-speed oversampling of the downsampling unit 22 is supplied to the matched filter of the first circuit. The averaging unit 26 of the first circuit averages time-series correlative values for a plurality of spreading-code cycles. The timing controller 27 applies timing at which a maximum correlation value is obtained to the code generator 28. The code generator 28 controls the timing of generating series spreading codes, which are supplied to the multipliers $29_1$–$29_k$ of the second circuit.

Output signals from the multipliers $29_1$–$29_k$ indicate correlation values between a signal provided by the high-speed oversampling and the series spreading codes that are controlled by the coarse despreading timing, and have phases that vary over high-speed oversampling intervals. The output signals from the multipliers $29_1$–$29_k$ are integrated by the adders $31_1$–$31_k$ and delay elements $32_1$–$32_k$. The timing signal output unit 33 compares integrated signals from the delay elements $32_1$–$32_k$ with one another. Further, the timing signal output unit 33 sends timing corresponding to a maximum one of the integrated signals as the despread timing to the despreading units.

The adders $31_1$–$31_k$ and delay elements $32_1$–$32_k$ form integrators to integrate the output signals of the multipliers for a sufficient time. The timing signal output unit 33 selects one of the integrators that indicates a maximum correlation value. In particular, there are k/2 integrators before and after the timing provided by the preceding stage. By detecting an integrator "i" among the k integrators that indicates a maximum correlation value, despread timing for the despreading units is found. Despread timing "tb" is obtained by adding $(i-k/2)\Delta_{high}$ to timing "ta" provided by the timing controller 27 of the preceding stage. In other words, tb={ta+$(i-k/2)\Delta_{high}$}. Here, $\Delta_{high}$ is calculated by dividing a chip period by an oversampling number in the latter stage, which is equal to a sampling number in the oversampling unit 21.

The matched filter of the first circuit has a structure suitable for the low-speed oversampling, to reduce the circuit scale than that of structure suitable for high-speed oversampling. The second circuit for the high-speed oversampling determines timing corresponding to a maximum correlation value around the timing provided by the first circuit. Accordingly, the second circuit has a small circuit scale to determine the despread timing at an accuracy corresponding to a high-speed oversampling interval.

Figure 3:
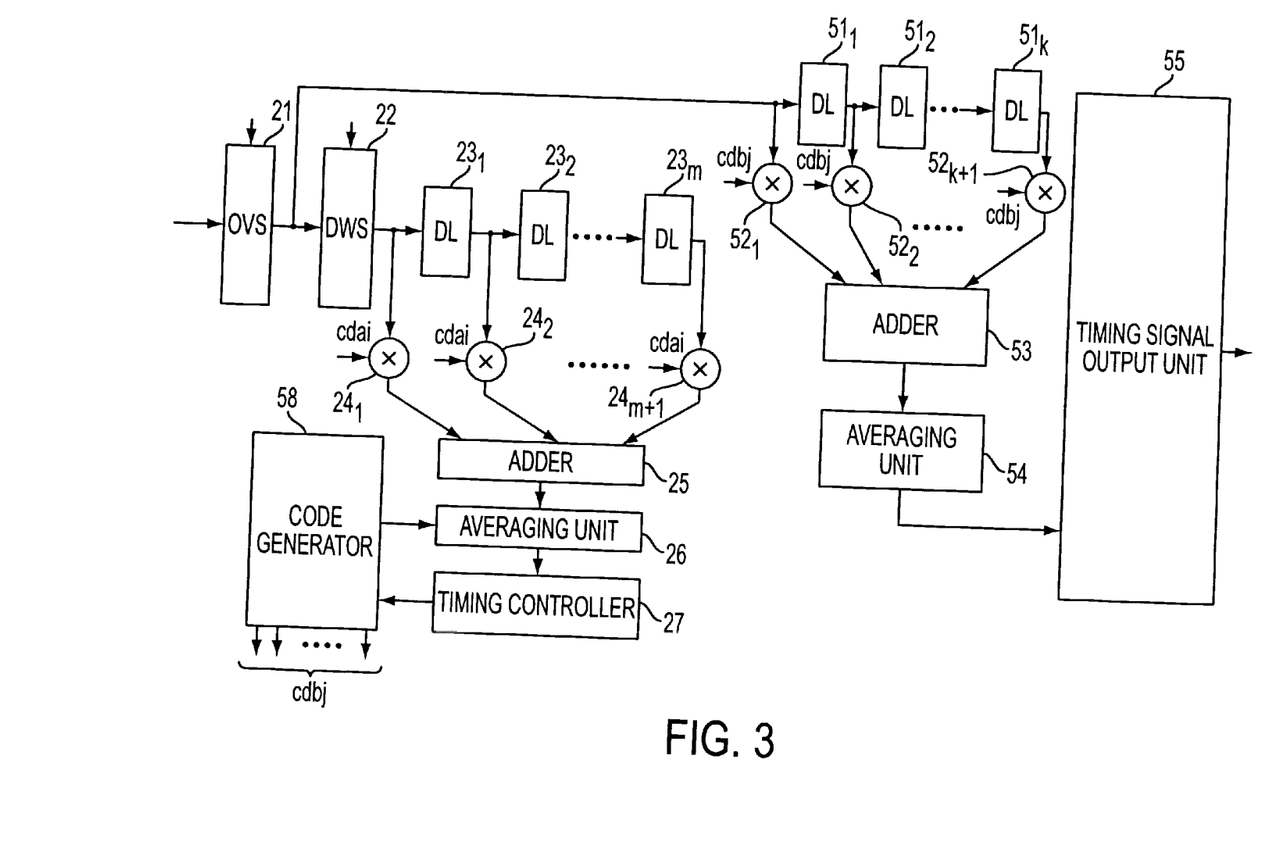
FIG. 3 is a block diagram showing a second embodiment of the path searching device according to the present invention.

FIG. 3 shows a second embodiment of the path searching device according to the present invention. The same parts as those of FIG. 2 are represented with the same reference numerals. Reference numerals $51_1$–$51_k$ designate delay elements having a delay time corresponding to a high-speed oversampling interval, $52_1$–$52_{k+1}$ multipliers, 53 an adder, 54 an averaging unit, 55 a timing signal output unit, and 58 a code generator.

Similar to the first embodiment, a first circuit of the second embodiment has a matched filter structure to receive signals provided by low-speed oversampling, and a second circuit thereof has a matched filter structure to receive signals provided by high-speed oversampling.

The code generator 58 generates spreading codes "cdbj" according to timing generated based on signals provided by the low-speed oversampling. Further, the code generator supplies the codes to the multipliers $52_1$–$52_{k+1}$ of the matched filter of the second circuit. Spreading codes "cdai" are applied to multiplexers $24_1$–$24_{m+1}$ at timing to carry out a path search, for example, at the start of a slot. The codes "cdai" may be generated by the code generator 58.

As explained above, the code generator 58 generates the spreading codes "cdbj" according to a timing signal provided by the timing controller 27 of the first circuit. In particular, the matched filter structure of the first circuit based on the low-speed oversampling provides coarse timing, which is used to generate the spreading codes "cdbj". Thereafter, a maximum correlation value provided by the matched filter structure of the second circuit based on the high-speed sampling is used to find despreading timing at an accuracy of the high-speed oversampling.

In this case, the matched filter of the second circuit is designated to receive spreading codes corresponding to one or several chips of the high-speed oversampling around timing corresponding to a maximum correlation value provided by the timing controller 27 of the first circuit. Accordingly, the matched filter of the second circuit has a smaller circuit scale.

Figure 4:
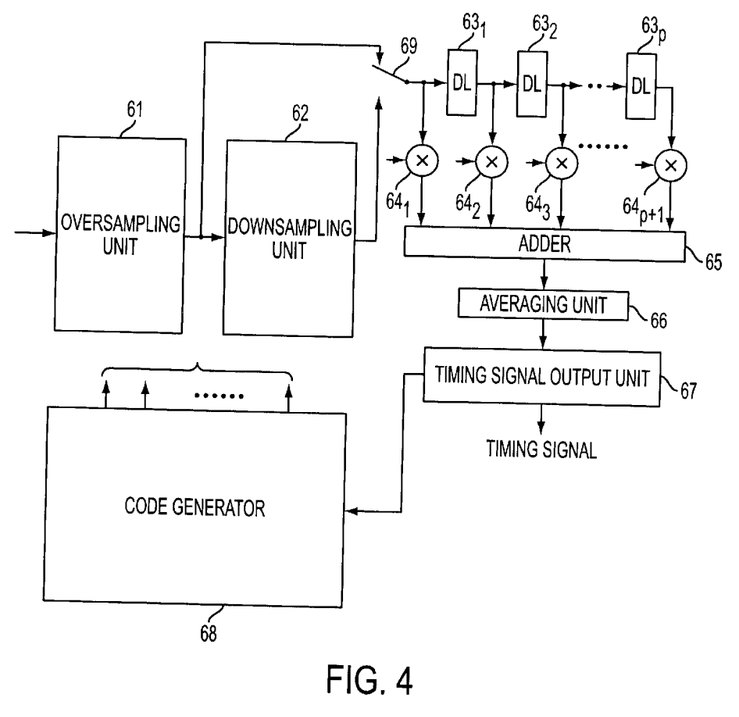
FIG. 4 is a block diagram showing a third embodiment of the path searching device according to the present invention.

FIG. 4 shows a third embodiment of the path searching device according to the present invention. Reference numeral 61 designates an oversampling unit, 62 a downsampling unit, $63_1$–$63_p$ delay elements (DLs), $64_1$–$64_{p+1}$ multipliers, 65 an adder, 66 an averaging unit, 67 a timing signal output unit, 68 a code generator, and 69 a switch.

This embodiment includes a matched filter structure for the first circuit and a matched filter structure for the second circuit into one. The switch 69 switches a signal provided by high-speed oversampling and a signal provided by low-speed oversampling between one another and supplies the signals to the matched filter. The switch 69 may be a transistor or a selector. The function of the downsampling unit 62 is for downsampling signals provided by the high-speed oversampling unit 61 may cover the function of the switch 69.

Switching intervals of the switch 69 corresponds to averaging intervals of the averaging unit 66 and may extend over a plurality of spreading-code cycles. A memory used for the averaging operation may be divided into one for the high-speed oversampling and another for the low-speed oversampling, to carry out the averaging operation in time division. In this case, the switching intervals may each be equal to a spreading-code cycle.

Signals provided by the low-speed oversampling of the downsampling unit 62 are supplied to the matched filter through the switch 69. A timing signal corresponding to a maximum correlation value is supplied from the timing signal output unit 67 to the code generator 68. According to the timing signal, the code generator 68 controls the timing of the spreading codes generated, which are supplied to the matched filter when the high-speed oversampling provides a signal to the matched filter through the switch 69. A timing signal corresponding to a maximum correlation value provided by the matched filter is supplied as a despread timing signal from the timing signal output unit 67 to the despreading units.

For example, the high-speed oversampling is eight times faster than a chip rate, and the low-speed oversampling is two times faster than the chip rate. If 8-bit spreading codes are employed, the number of taps of a shift register that constitutes the matched filter that provides correlation values according to signals provided by the low-speed oversampling is 8×2=16. Since the number of taps of the shift register that forms the matched filter for finding correlation values according to a signal provided by the high-speed oversampling is also 16, two among the eight bits are selected as spreading codes for the high-speed oversampling around the timing obtained according to the low-speed oversampling. Further, the selected bits are supplied to the multipliers $64_1$–$64_{p+1}$. In this way, the same matched filter is used in time division for the high-speed oversampling and low-speed oversampling, to find despreading timing.

The present invention is not limited to the embodiments mentioned above. Many additions and modifications are possible on them. The embodiments are applicable to form a path search device of a CDMA receiver for a base or mobile station of a direct sequence CDMA communication system.

As explained above, the present invention includes the first circuit 16 in FIG. 1 that receives signals provided by low-speed oversampling and finds timing corresponding to a maximum correlation value with the use of a matched filter structure. The present invention also includes the second circuit 17 that finds correlative values between a signal provided by high-speed oversampling and spreading codes generated according to the timing provided by the first circuit 16. Further, the second circuit finds despreading timing at an accuracy of the high-speed oversampling.

Since the first circuit 16 has the matched filter structure suitable for the low-speed oversampling, the circuit scale thereof may be a fraction of a matched filter structure designed for high-speed oversampling. When the second circuit 17 employs an integrator structure or a matched filter structure, it may be constructed to find correlative values for a signal provided by high-speed oversampling in the range of one to several chips around the timing provided by the first circuit 16. As a result, the circuit scale of the second circuit 17 is greatly reduced from a general structure designed for high-speed oversampling.

Further, the first circuit 16 and second circuit 17 may share a matched filter structure. A signal provided by high-speed oversampling and a signal provided by low-speed oversampling may be switched from one to another in time division and supplied to the matched filter structure, to find despreading timing at an accuracy of the high-speed oversampling. This may further reduce the overall circuit scale. The present invention is applicable to a CDMA receiver for a base or mobile station of a direct spreading CDMA communication system, to reduce the size and power consumption thereof.

What is claimed is:

1. A path searching device for determining despread timing of an input signal in a direct-sequence code division multiple access (CDMA) system, comprising:
    a sampling unit for sampling the input signal to produce a first sampled signal and a second sampled signal;
    a first circuit for finding a maximum correlation value between the first sampled signal and a spreading code; and
    a second circuit for determining the despread timing of the input signal according to correlation values between the second sampled signal and a spreading code corresponding to the timing of the maximum correlation value of the first circuit.

2. The device of claim 1, wherein the first sampled signal is produced by sampling the input signal based on an integer multiple of a chip rate.

3. The device of claim 1, wherein the second sampled single is produced by sampling the input signal at a higher sampling rate than the first sampled signal.

4. The device of claim 1, wherein the first circuit is a matched filter.

5. The device of claim 1, wherein the second circuit shifts the phase of the spreading code by an interval of the second sampled signal, finds the correlation values between the spreading code and the second sampled signal, integrates the correlation values to determine the despread timing.

6. The device of claim 1, wherein the second circuit includes delay elements for shifting the phase of the spreading code by an interval of the second sampled signal, multipliers for finding the correlation values between the spreading code from the delay elements and the second sampled signal, an integrator for integrating the correlation values to determine the despread timing.

7. The device of claim 1, wherein the second circuit is a second matched filter for finding a second maximum correlation value between the second sampled signal and the spreading code, wherein the second maximum correlation value corresponds to the despread timing.

8. A path searching device for determining despread timing of an input signal in a direct-sequence code division multiple access (CDMA) system, comprising:
    a sampling unit for sampling the input signal to produce a first sampled signal and a second sampled signal; and
    a matched filter for finding a maximum correlation value between the first sampled signal and a spreading code when the first sampled signal is applied to the matched filter, the matched filter further determining the despread timing of the input signal according to correlation values between the second sampled signal and a spreading code corresponding to the timing of the maximum correlation value when the second sampled signal is applied to the matched filter.

9. The device of claim 8, which further includes a switch for providing the first and second sampled signal to the matched filter in time division.

10. A receiver for a direct-sequence code division multiple access (CDMA) system including a reception demodulator, a despreading unit, a determination unit and a path searching device, comprising:
    the path searching device including:
    a sampling unit for sampling an input signal from the reception demodulator to produce a first sampled signal and a second sampled signal;
    a first circuit for finding a maximum correlation value between the first sampled signal and a spreading code; and
    a second circuit for providing despread timing of the input signal to the despreading unit according to correlation values between the second sampled signal and a spreading code corresponding to the timing of the maximum correlation value of the first circuit.

11. The receiver of claim 10, wherein the second sampled single is produced by sampling the input signal at a higher sampling rate than the first sampled signal.

12. The receiver of claim 10, wherein the first circuit is a matched filter.

13. The receiver of claim 10, wherein the second circuit shifts the phase of the spreading codes by an interval of the second sampled signal, finds the correlation values between the spreading code and the second sampled signal, integrates the correlation values to determine the despread timing.

14. The receiver of claim 10, wherein the second circuit includes delay elements for shifting the phase of the spreading code by an interval of the second sampled signal, multipliers for finding the correlation values between the spreading code from the delay elements and the second sampled signal, an integrator for integrating the correlation values to determine the despread timing.

15. The receiver of claim 10, wherein the second circuit is a second matched filter for finding a second maximum correlation value between the second sampled signal and the spreading the code, wherein the second maximum correlation value corresponds to the despread timing.

16. A receiver for a direct-sequence code division multiple access (CDMA) system including a reception demodulator, a despreading unit, a determination unit and a path searching device, comprising:

the path searching device including:

a sampling unit for sampling an input signal from the reception demodulator to produce a first sampled signal and a second sampled signal; and a matched filter for finding a maximum correlation value between the first sampled signal and a spreading code when the first sampled signal is applied to the matched filter, the matched filter further providing despread timing of the input signal to the despreading unit according to correlation values between the second sampled signal and a spreading code corresponding to the maximum correlation value when the second sampled signal is applied to the matched filter.

17. The receiver of claim 1, which further includes a switch for providing the first and second sampled signal to the matched filter in time division.

18. A path searching method for determining despread timing of an input signal in a direct-sequence code division multiple access (CDMA) system, comprising:

sampling the input signal to produce a first sampled signal and a second sampled signal;

finding a maximum correlation value between the first sampled signal and a spreading code; and determining the despread timing of the input signal according to correlation values between the second sampled signal and a spreading code corresponding to the maximum correlation value.

19. The method of claim 18, wherein the second sampled single is produced by sampling the input signal at a higher sampling rate than the first sampled signal.

20. The method of claim 18, wherein determining the despread timing includes shifting the phase of the spreading code by an interval of the second sampled signal, finding the correlation values between the spreading code and the second sampled signal, and integrating the correlation values.

* * * * *